United States Patent
Bao et al.

(10) Patent No.: US 9,259,714 B2
(45) Date of Patent: Feb. 16, 2016

(54) HIGH-EFFICIENCY SOLAR WATER SPLITTING BY NANOCRYSTALLINE COBALT (II) OXIDE PHOTOCATALYST AND USES THEREOF

(71) Applicants: Jiming Bao, Pearland, TX (US); Longb Liao, Houston, TX (US)

(72) Inventors: Jiming Bao, Pearland, TX (US); Longb Liao, Houston, TX (US)

(73) Assignee: UNIVERSITY OF HOUSTON, Houston, TX (US)

( * ) Notice: Subject to any disclaimer, the term of this patent is extended or adjusted under 35 U.S.C. 154(b) by 0 days.

(21) Appl. No.: 14/322,140

(22) Filed: Jul. 2, 2014

(65) Prior Publication Data

US 2015/0010463 A1    Jan. 8, 2015

Related U.S. Application Data

(60) Provisional application No. 61/843,279, filed on Jul. 5, 2013.

(51) Int. Cl.
*B01J 23/75* (2006.01)
*C01B 3/04* (2006.01)

(52) U.S. Cl.
CPC . *B01J 23/75* (2013.01); *C01B 3/042* (2013.01)

(58) Field of Classification Search
CPC .................................. C01B 3/042; B01J 23/75
See application file for complete search history.

(56) References Cited

U.S. PATENT DOCUMENTS

| | | | |
|---|---|---|---|
| 6,838,413 B2 | 1/2005 | Domen et al. | |
| 6,864,211 B2 | 3/2005 | Domen et al. | |
| 6,878,666 B2 | 4/2005 | Domen et al. | |
| 7,217,678 B2 | 5/2007 | Rao et al. | |
| 7,338,590 B1 | 3/2008 | Shelnutt et al. | |
| 2012/0027672 A1* | 2/2012 | Wang et al. | 423/658 |
| 2012/0097521 A1* | 4/2012 | Shen et al. | 204/157.47 |
| 2012/0328505 A1 | 12/2012 | Frei et al. | |
| 2015/0010463 A1 | 1/2015 | Bao et al. | |

FOREIGN PATENT DOCUMENTS

| | | | |
|---|---|---|---|
| WO | WO-2012097242 A1 | 7/2012 | |
| WO | WO-2015003040 A1 | 1/2015 | |

OTHER PUBLICATIONS

Scheffe et al. "Hydrogen Production via Chemical looping..." 2011 Chemistry of Materials, 23, 2030-2038.*
Southwest Catalysis Society, Rice University, Houston, Apr. 2012.
(Continued)

*Primary Examiner* — Stanley Silverman
*Assistant Examiner* — Syed Iqbal
(74) *Attorney, Agent, or Firm* — Winstead PC (57) ABSTRACT

In an embodiment, the present disclosure pertains to photocatalysts with high solar-to-hydrogen overall water splitting efficiency. In an embodiment, the photocatalyst is a nanocrystalline cobalt (II) oxide (CoO) nanoparticle. In some embodiments, the present disclosure pertains to methods of synthesizing the photocatalysts disclosed herein. Such a method may comprise using femtosecond laser ablation of cobalt oxide micropowders. In some embodiments, such a method comprises mechanical ball milling of cobalt oxide micropowders. In an embodiment, the photocatalyst disclosed herein decomposes water under visible light without the aid of any co-catalysts or sacrificial reagents. In some embodiments, the present disclosure pertains to methods of splitting water to produce hydrogen.

23 Claims, 3 Drawing Sheets

(56) References Cited

OTHER PUBLICATIONS

Scheffe et al., "Hydrogen Production via Chemical Looping Redox Cycles Using Atomic Layer Despostiion—Synthesized Iron Oxide and Cobalt Ferrites" Chemistry of Materials, Mar. 24, 2011, downloaded from <http://www.researchgate.net/publication/231240945_Hydrogen_Production_via_Chemical_Looping_Redox_Cycles_Using_Atomic_Layer_DespositionSynthesized_Iron_Oxide_and_Cobalt_Ferrites/file/79e415112dd651a730.pdf>, pp. 2030-2038. entire document.

International Search Report for PCT/US2014/045207 dated Oct. 31, 2014.

Liao, Longb, et al., "High-efficiency Solar Water Splitting by nanocrystalling CoO Photocatalyst," pp. 1-15.

Chen, X. B., Shen, S. H., Guo, L. J. & Mao, S. S. Semiconductor-based Photocatalytic Hydrogen Generation. *Chem. Rev.* 110, 6503-6570 (2010).

Kudo, A. & Miseki, Y. Heterogeneous photocatalyst materials for water splitting. *Chem. Soc. Rev.* 38, 253-278 (2009).

Osterloh, F. E. & Parkinson, B. A. Recent developments in solar water-splitting photocatalysis. *MRS Bull.* 36,17-22 (2011).

Mallouk, T. E. The Emerging Technology of Solar Fuels. *J Phys. Chem. Lett.* 1, 2738-2739 (2010).

Fujishima, A. & Honda, K. Electrochemical photolysis of water at a semiconductor electrode. *Nature* 238, 37(1972).

Walter, M. G. et al. Solar Water Splitting Cells. *Chem. Rev.* 110, 6446-6473 (2010).

Zhao, Z. W., Konstantinov, K., Yuan, L., Liu, H.K. & Dou, S. X. In-situ fabrication of nanostructured cobalt oxide powders by spray pyrolysis technique. *J Nanosci. Nanotechnol.* 4, 861-866 (2004).

Zou, Z. G., Ye, J. H., Sayama, K. & Arakawa, H. Direct splitting of water under visible light irradiation with an oxide semiconductor photocatalyst. *Nature* 414, 625-627 (2001).

Maeda, K., Teramura, K. & Domen, K. Effect of post-calcination on photocatalytic activity of(Ga1-xZnx)(N1-xOx) solid solution for overall water splitting under visible light. *J Catal.* 254, 198-204 (2008).

Mubeen, S. et al. An autonomous photosynthetic device in which all charge carriers derive from surface plasmons. *Nat. Nanotechnol.* 8, 247-251 (2013).

Liu, C., Tang, J., Chen, H. M., Liu, B. & Yang, P. A Fully Integrated Nanosystem of Semiconductor Nanowires for Direct Solar Water Splitting. *Nano Lett.* 13, dx.doi .org/10.1021 /nl401615t (2013).

Yang, J., Liu, H. W., Martens, W. N. & Frost, R. L. Synthesis and Characterization of Cobalt Hydroxide, Cobalt Oxyhydroxide, and Cobalt Oxide nanodiscs. J. Phys. Chem. C p. 114, 111-119 (2010).

Yang, G. W. Laser ablation in liquids: Applications in the synthesis of nanocrystals. *Prog. Mater. Sci.* 52, 648-698 (2007).

Xu, Y. & Schoonen, M. A. A. The absolute energy positions of conduction and valence bands of selected semiconducting minerals. *Am. Miner.* 85, 543-556 (2000).

Vayssieres, L. et al. One-dimensional quantum-confinement effect in alpha-Fe2O3 ultrafine nanorod arrays. *Adv. Mater.* 17, 2320-2323 (2005).

Shi, H. G. & He, X. M. Large-scale synthesis and magnetic properties of cubic CoO nanoparticles. *J. Phys. Chem. Solids* 73, 646-650 (2012).

Yin, J. S. & Wang, Z. L. Ordered self-assembling of tetrahedral oxide nanocrystals. *Phys. Rev. Lett.* 79, 2570-2573 (1997).

Barreca, D. et al. Controlled vapor-phase synthesis of cobalt oxide nanomaterials with tuned composition and spatial organization. *Crystengcomm* 12, 2185-2197 (2010).

Gallant, D., Pezolet, M. & Simard, S. Optical and physical properties of cobalt oxide films electrogenerated in bicarbonate aqueous media. *J. Phys. Chem. B* 110, 6871-6880 (2006).

Amirav, L. & Alivisatos, A. P. Photocatalytic Hydrogen Production with Tunable Nanorod Heterostructures. *J. Phys. Chem. Lett.* 1, 1051-1054 (2010).

Wang, H. L. & Turner, J. A. Characterization of Hematite Thin Films for Photoelectrochemical Water Splitting in a Dual Photoelectrode Device. J. Electrochem. Soc. 157, F173-F178 (2010).

Markus, T. Z. et al. Electronic Structure of CdSe Nanoparticles Adsorbed on Au Electrodes by an Organic Linker: Fermi Level Pinning of the HOMO. *J. Phys. Chem.* C113, 14200-14206 (2009).

Frame, F. A. et al. First demonstration of CdSe as a photocatalyst for hydrogen evolution from water under UV and visible light. *Chem. Commun.*, 2206-2208 (2008).

McCarthy, T. J., Tanzer, T. A. & Kanatzidis, M. G. A new metastable 3-dimensional bismuth sulfide with large tunnels—synthesis, structural characterization, ion-exchange properties, and reactivity of KBi3S5 . *J. Am. Chem. Soc.* 117, 1294-1301 (1995).

Holmes, M. A., Townsend, T. K. & Osterloh, F. E. Quantum confinement controlled photocatalytic water splitting by suspended CdSe nanocrystals. *Chem. Commun.* 48, 371-373 (2012).

Jasieniak, J., Califano, M. & Watkins, S. E. Size-Dependent Valence and Conduction Band-Edge Energies of Semiconductor Nanocrystals. *ACS Nano* 5, 5888-5902 (2011).

Ishikawa, A. et al. Oxysulfide Sm2 Ti2S2O5 as a stable photocatalyst for water oxidation and reduction under visible light irradiation (lambda <= 650 nm). *J. Am. Chem. Soc.* 124, 13547 13553 (2002).

Pinaud, B. A., Chen, Z. B., Abram, D. N. & Jaramillo, T. F. Thin Films of Sodium Birnessite-Type MnO(2): Optical Properties, Electronic Band Structure, and Solar Photoelectrochemistry. *J. Phys. Chem. C* 115, 11830-11838 (2011 ).

Nocera, D. G. The Artificial Leaf. *Accounts Chem. Res.* 45, 767-776 (2012).

Riha, S. C. et al. Atomic Layer Deposition of a Submonolayer Catalyst for the Enhanced Photoelectrochemical Performance of Water Oxidation with Hematite. *ACS Nano* 1, 2396-2405 (2013).

Marinescu, S. C., Winkler, J. R. & Gray, H. B. Molecular mechanisms of cobalt-catalyzed hydrogen evolution. *Proc. Natl. Acad. Sci. U. S. A.* 109, 15127-15131 (2012).

Jiao, F. & Frei, H. Nanostructured Cobalt Oxide Clusters in Mesoporous Silica as Efficient Oxygen-Evolving Catalysts. *Angew. Chem.-Int. Edit.*48, 1841-1844 (2009).

\* cited by examiner

HIGH-EFFICIENCY SOLAR WATER SPLITTING BY NANOCRYSTALLINE COBALT (II) OXIDE PHOTOCATALYST AND USES THEREOF

CROSS REFERENCE TO RELATED APPLICATIONS

This application claims priority to U.S. Provisional Patent Application No. 61/843,279, filed in the United States Patent and Trademark Office on Jul. 5, 2013, incorporated by reference herein in its entirety.

STATEMENT REGARDING FEDERALLY SPONSORED RESEARCH

The invention was supported, in whole or in part, by National Science Foundation grant number DMR 0907336 and the Welch Foundation grant number E-1728. The Government has certain rights in the invention.

BACKGROUND

Increasing energy demand and growing environmental concerns drive the search for renewable sources of energy to replace the fast depleting fossil fuel energy sources. Since the only way to store large amounts of energy is in the form of a chemical energy carrier, hydrogen is considered as one of the primary candidates for future energy storage. An ideal process for hydrogen production is to use water as a hydrogen source together with solar energy for conversion. Accordingly, photocatalytic water splitting (which is the light-induced conversion reaction of water to hydrogen and oxygen) has attracted attention as one of the most promising hydrogen production processes. However, efficient water splitting, using photocatalysts has been a huge challenge. Accordingly, there is a need in the art for improved photocatalysts for efficient water splitting for the production of hydrogen.

SUMMARY

Current photocatalysts employed in water splitting to produce hydrogen suffer from low efficiency in converting solar energy directly to chemical fuels. In an embodiment, the present disclosure pertains to a photocatalyst that utilizes solar energy for overall water splitting with high solar-to-hydrogen efficiency. In some embodiments the present disclosure relates to a photocatalyst for generating hydrogen from water using visible light irradiation comprising nanocrystalline cobalt (II) oxide nanoparticles. In some embodiments the flat-band potential of the nanocrystalline cobalt (II) monoxide nanoparticles photocatalyst is less than that of bulk cobalt oxide micropowders by more than 1 eV.

In some embodiments, the present disclosure pertains to methods of synthesizing the photocatalyst. In some embodiments, the photocatalyst comprises nanocrystalline cobalt (II) oxide nanoparticles. In some embodiments, the nanocrystalline cobalt (II) oxide nanoparticles are fabricated from cobalt oxide micropowders by using femtosecond laser ablation. In some embodiments, the nanocrystalline cobalt (II) oxide nanoparticles are fabricated from cobalt oxide nanoparticles by mechanical ball milling. In an embodiment, the photocatalysts of the present disclosure decompose water under visible light without the aid of any co-catalysts or sacrificial reagents.

In some embodiments, the present disclosure pertains to a method of generating hydrogen from water. Such a method comprises suspending a nanocrystalline photocatalyst in water. In some embodiments, the nanocrystalline photocatalyst comprises nanocrystalline cobalt (II) oxide nanoparticles. In some embodiments, such a method comprises heating the suspension thus formed. In some embodiments, the method further comprises exposing the suspension to visible light irradiation. In some embodiments the suspension is exposed to light wavelength ranging from about 400 nm to about 700 nm. In some embodiments, the light wavelength is 650 nm.

In some embodiments the method comprises separating the hydrogen gas generated. In some embodiments, the nanocrystalline photocatalyst decomposes the water to generate $H_2$ and $O_2$ in a stoichiometric 2:1 ratio.

The above objects and other objects, features, and advantages of the present disclosure are readily apparent from the following detailed description of the best mode for carrying out the invention when taken in conjunction with the accompanying drawings.

BRIEF DESCRIPTION OF THE DRAWINGS

FIGS. 2A-2D show a typical GC trace of evolved hydrogen and oxygen (FIG. 2A), production of hydrogen and oxygen using ~12 mg of crystalline cobalt (II) oxide nanoparticles as a function of incident laser power (FIG. 2B). The laser wavelength is 532 nm. FIGS. 2C-2D show generation of $H_2$ and $^{36}O_2$ using $^{18}O$-labeled water. The curves are vertically shifted for clarity. FIGS. 3A-3D show UV-visible diffuse reflectance spectra of crystalline cobalt (II) oxide nanoparticles and cobalt oxide powders (FIG. 3A)

DETAILED DESCRIPTION

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes only and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

The generation of hydrogen from water using sunlight or the visible spectrum of solar radiation plays a significant role in providing fuel to meet the world's energy demands while also potentially mitigating climate change by reducing carbon emission. Since the discovery of splitting water to generate hydrogen, there has been great interest in developing highly efficient photocatalysts that are able to catalyze the conversion of water to oxygen and hydrogen using solar energy. Among various hydrogen-generation techniques involving photocatalysts, overall water splitting (OWS) using pure water without external bias or sacrificial reagents is appealing because of enormous and sustainable supply of sun light and water. Unlike processes such as photoelectrochemical or water electrolysis using photovoltaics, OWS does not require an external power supply or intermediate conversion steps. Hence, OWS photocatalysts, in particular those based on nanoparticles, could potentially offer a higher overall light-to-chemical energy conversion efficiency by eliminating intermediate charge transport step. However, the development of OWS catalysts, especially those that can be efficiently driven by the visible spectrum of solar radiation, remains a great challenge due to many concurrent material requirements.

The first visible light OWS photocatalysts were not demonstrated until nearly 30 years after the 1972 discovery by Fujishima and Honda. Despite rapid progress made in the past decade, to date the well-known visible light photocatalyst, $(Ga_{1-x}Zn_x)(N_{1-x}O_x)$, remains active up to 440 nm (near UV light) only, with an optimal hydrogen generation rate of about 1 mmol $h^{-1}g^{-1}$ under favorable acid conditions instead of pure water. Recent advances in nanophotonics and nanomaterial have made it possible to design and fabricate multicomponent nanoheterostructure water-splitting devices that can harvest visible light, but their solar-to-hydrogen efficiency still remains as low as 0.1%. In addition, nearly all known photocatalysts used for OWS reaction need to be loaded with a suitable co-catalyst for activation. Because the peak intensity of the solar spectrum is located near 550 nm, an ideal photocatalyst for practical, large-scale application, is required to exhibit a high activity at wavelength greater than 500 nm, and to exhibit optimum catalytic activity in pure water (i.e., without the need for salts, acid, or any other chemical).

In an embodiment, the present disclosure relates to a cost effective, highly efficient photocatalyst for overall splitting of water that exhibits an unprecedented catalytic activity at wavelengths greater than 500 nm, thereby enabling the use of solar energy for triggering the photocatalytic reaction to generate hydrogen. In an embodiment of the present disclosure, the nanocrystalline photocatalysts disclosed herein are able to achieve OWS without the need for external bias or any other chemical agent such as sacrificial reagents or co-catalysts.

In some embodiments of the present disclosure, the photocatalysts comprises metal oxides such as cobalt oxide nanocrystals. Other metal oxides are also contemplated. Specifically, the present disclosure relates to photocatalysts comprising metal oxides where Co is totally or partially substituted. For example, oxides of alloy of Co, Ni, and Fe substituted for Ni or Fe.

In some embodiments the photocatalyst comprises of crystalline cobalt (II) oxide nanoparticles. In some embodiments of the present disclosure, the crystalline cobalt (II) oxide nanoparticles are formed from bulk cobalt oxide micropowders. In some embodiments of the present disclosure, the flat-band potential of crystalline cobalt (II) oxide nanoparticles is less than that of bulk cobalt oxide micropowders by more than 1 eV.

In some embodiments of the present disclosure, the photocatalyst may be configured or provided to have any suitable solid form, such as a film, a coating, a porous structure, a particulate structure, and the like. In some embodiments of the present disclosure the crystalline cobalt (II) oxide nanoparticles form a cubic lattice structure. One preferred structure is a nanoparticulate structure where the particles are small and can form slurry with the water molecules. In some embodiments, the particles include or consist essentially of nanoparticles. These nanoparticles may be spherical or close to spherical in shape. Nanoparticles which are in the form of nanowires, nanotubes, or irregular shaped particles may also be used. If the particles do not have a spherical shape, the size of the particles can be characterized by the diameter of a generally corresponding sphere having the same total volume as the particle.

Preferably, the nanoparticles have an average diameter of less than about 10 nm. In some embodiments of the present disclosure, the size of the crystalline cobalt (II) oxide nanoparticles is less than 10 nm. Without being bound by any theory, it is believed that the nanostructures disclosed herein may exhibit enhanced photocatalytic activity due to a large surface to volume ratio. Moreover, the photocatalyst disclosed herein may be inert and have very less solubility in water under experimental conditions.

In some embodiments of the present disclosure, the photocatalyst is activated in the visible light spectrum. In some embodiments of the present disclosure the photocatalyst is activated at a wavelength of light ranging from about 400 nm to about 700 nm. In some embodiments, the photocatalyst is activated at a wavelength of 650 nm. Without being bound by any theory, in some embodiments of the present disclosure, the photocatalyst may be activated in the visible light spectra without the use of any external bias or sacrificial reagents.

In some embodiments, the present disclosure relates to overall water splitting (OWS) photocatalyst with a highly efficient water-splitting activity. In some embodiments, the photocatalyst disclosed herein has a conduction-band edge potential above the hydrogen-evolution potential. In some embodiments of the present disclosure, the photocatalyst has a valence-band edge potential below the oxygen potential.

In some embodiments of the present disclosure, the photocatalyst comprises crystalline cobalt (II) oxide nanoparticles. In some embodiments the crystalline cobalt (II) oxide nanoparticles with OWS capabilities are fabricated using femtosecond laser ablation. Briefly, the methods of fabricating the cobalt (II) oxide nanocrystals using femtosecond laser ablation involve the following steps: (i) $Co_3O_4$ powders of less than 10 μM in diameter are decomposed into CoO powders in a quartz furnace at 1050° C. under ultrapure argon. The heating may also be accomplished by lower temperatures (950° C.) in vacuum or other inert gases such as $N_2$; (ii) the resulting CoO powders are mixed with neutral water and illuminated with femtosecond laser pulses at 850 nm, 100 fs, 375 mW at a frequency of 1 kHz at room temperature for about an hour to generate cobalt (II) oxide nanocrystals. Alternatively, the illumination may also be accomplished by using a white light fiber optic and most notably, sunlight.

Alternatively, cobalt (II) oxide nanocrystals are obtained using other synthesis techniques. In some embodiments of the present disclosure, the nanoparticles are fabricated using mechanical ball milling of cobalt oxide micropowders. In some embodiments, cobalt oxide micropowders are physically crushed into nanoparticles during ball milling (SPEX Sampleprep 8000 M Mixer/Mill). In some embodiments, the resulting cobalt (II) oxide nanocrystals are separated from water by gravity. Alternatively, the separation may also be accomplished by using filtration. In some embodiments, the methods of fabricating the cobalt (II) oxide nanocrystals disclosed herein lead to the formation of 5 nm-size nanocrystals with a rock salt crystal structure that are able to achieve OWS at 532 nm at an energy conversion rate of 10%, and leading to production of hydrogen gas at 50 mmol $h^{-1}g^{-1}$. Without being bound by any theory, both methods utilize clean physical processes, to create crystalline nanoparticles from cobalt oxide micropowders. In some embodiments, the cobalt oxide micropowders are obtained through thermal decomposition from $Co_3O_4$ micropowders (particle size <10 µm, Sigma-Aldrich). In some embodiments the cobalt (II) oxide nanoparticles are synthesized using wet chemistry. In some embodiments of the present disclosure the crystalline cobalt (II) oxide nanoparticles fabricated from the two methods disclosed herein, show very similar properties. In some embodiments the active crystalline cobalt (II) oxide nanoparticles are obtained from non-active bulk cobalt oxide micropowders.

Preferably, the photocatalyst disclosed herein and used in the process will generally be stable, such that the rate of hydrogen generation at a given temperature and a given intensity of light does not significantly decline over time. In some embodiments, the photocatalyst disclosed herein exhibit properties that are characteristic to those of catalytic materials. For example, cobalt (II) oxide nanocrystals are not consumed or morphologically changed during the OWS reaction. In some embodiments, the photocatalyst disclosed herein does not require other chemical agents such as co-catalysts or other sacrificial agents for carrying out OWS.

In some embodiments, the photocatalyst disclosed herein may be further configured to receive a co-catalyst or other nanostructures for enhancement of the photocatalytic reaction and for increasing the stability of the photocatalyst. The co-catalyst may comprise nanoparticles or nanorods. The co-catalyst may comprise a core-shell structure comprising a lanthanide/transition metal core and a metal oxide shell. The transition metal may comprise nickel (Ni), copper (Cu), molybdenum (Mo), silver (Ag), platinum (Pt), or gold (Au). Other transition metals are also contemplated. The lanthanide metal may comprise cerium (Ce), erbium (Er), or europium (Eu). Other lanthanide metals are also contemplated. In an embodiment, the cobalt (II) oxide nanoparticles are attached to a porous substrate. In an embodiment, the porous substrate is $SiO_2$, alumina or zeolite. In an embodiment, the attaching of the cobalt (II) oxide nanoparticles to the porous substrate (i) prevents aggregation of nanoparticles, and (ii) facilitates electron-hole charge separation and prevents the oxidation of CoO.

In some embodiments, the present disclosure pertains to a method of generating hydrogen from water using the photocatalysts disclosed herein. In some embodiments, the photocatalyst comprises cobalt (II) oxide nanoparticles. Such a method comprises suspending the nanocrystalline photocatalyst in water. In some embodiments, the method further comprises heating the suspension to 60° C. and exposing the water to visible light irradiation. In some embodiments, the method comprises separating and collecting the hydrogen gas generated. In some embodiments, the OWS reaction using the photocatalyst is best conducted under optimal conditions for temperature, oxygen and hydrogen pressures, pH value and light intensity. In some embodiments, the pH level of the water containing the nanocrystalline photocatalyst may be adjusted to values higher or lower than 7.0. In some embodiments, the method disclosed herein split water to generate hydrogen and oxygen in a stoichiometric 2:1 ratio.

In addition to generating hydrogen gas, the method desirably will also generate oxygen gas. Thus, the method may further comprise one or more steps of separating the oxygen gas from the hydrogen gas, separating the oxygen gas from the water, and storing the oxygen, or any combination thereof.

In some embodiments of the present disclosure, the photocatalyst disclosed has a solar-to-hydrogen energy conversion efficiency of about 5%. In a related embodiment, the crystalline cobalt (II) oxide (CoO) nanoparticles split pure water at a high rate without the assistance of co-catalysts or sacrificial chemicals.

The compositions (e.g., photocatalysts) and methods described herein may be used or be employed in a system or an apparatus for generating hydrogen molecules from sunlight and water in a reaction zone, comprising: i) an optical intensification system, wherein the optical intensification system increases the intensity of sunlight into the reaction zone; ii) water in the form of liquid or water vapor or both; and iii) nanoparticles of crystalline cobalt (II) oxide photocatalyst in the reaction zone and in contact with water; where the reaction zone is exposed to the concentrated sunlight; the reaction zone is free of an electrode; such that a reaction occurs that generates hydrogen molecules from the water. The system or the apparatus for generating hydrogen molecules may further be characterized by one or any combination of the following: the system further comprises a means (e.g. a pump, or a blower) for circulating the water (e.g., liquid water, steam, or both) through the reaction zone; the system further comprises a thermal reservoir for storing heat from the reaction zone, for providing heat to the reaction zone, or both; the system further comprises a separator for isolating the hydrogen molecules generated in the reaction zone; the system further comprises a separator for isolating the oxygen molecules that are generated in the reaction zone.

APPLICATIONS AND ADVANTAGES

The exponentially growing energy demand is exhausting the fossil fuel supply of the world at an alarming rate. With the global warming and climate changes from the fossil fuel greenhouse gases becoming a major concern, environmentally clean alternative renewable energy resources are of vital importance. By moving closer to practical on-site production of pure and clean $H_2$ from water using abundant sunlight in a safe, environmentally friendly way, the invention disclosed herein will contribute to reductions of greenhouse gas emission and reductions in imported energy. Breakthroughs will be made possible in the development of small stationary and portable fuel cells, resulting in the fast-growing market for them as mini-plants for use in factories, offices, retail stores, and homes.

The discovery of this highly active photocatalyst provides an unprecedented opportunity for developing practical solar fuel applications and gaining new insights into the microscopic understanding of photocatalytic water-splitting. According to conventional wisdoms, a highly active water-splitting particulate system requires intimate integration of a suitable semiconductor particle with separate hydrogen and oxygen evolution co-catalysts. Because such structure will not only reduce the water-splitting back-reaction, but also takes advantage of unique catalytic and optical properties of individual component of the system. Despite this surprising catalytic property of crystalline cobalt (II) oxide nanoparticles, Co-based catalysts have become emerging nanomaterials for oxygen evolution, hydrogen evolution, and artificial photosynthesis. The present disclosure adds to the growing potentials of Co-based photocatalysts, and provides for the acceleration of the pace of development of next generation solar fuel photocatalysts.

The present invention finds useful applications in renewable energy systems, fuel cells, clean fuels, hydrogen combustion engines, the generation of hydrocarbons when $CO_2$ is added to water, as catalyst for other chemical processes to name a few.

Among the advantages of the technology are that no electrodes, applied fields, ion or electron currents or intrinsic charge carrier densities are required in the water or particles in order to effect the thermal activation of the photocatalytic generation of the hydrogen, and the systems may be free of one or any combination of such features. It should be realized, however, the invention contemplates the optional use of such features.

ADDITIONAL EMBODIMENTS

Reference will now be made to various embodiments of the present disclosure and experimental results that provide support for such embodiments. Applicants note that the disclosure herein is for illustrative purposes only and is not intended to limit the scope of the claimed subject matter in any way.

Example 1

Figure 1A:
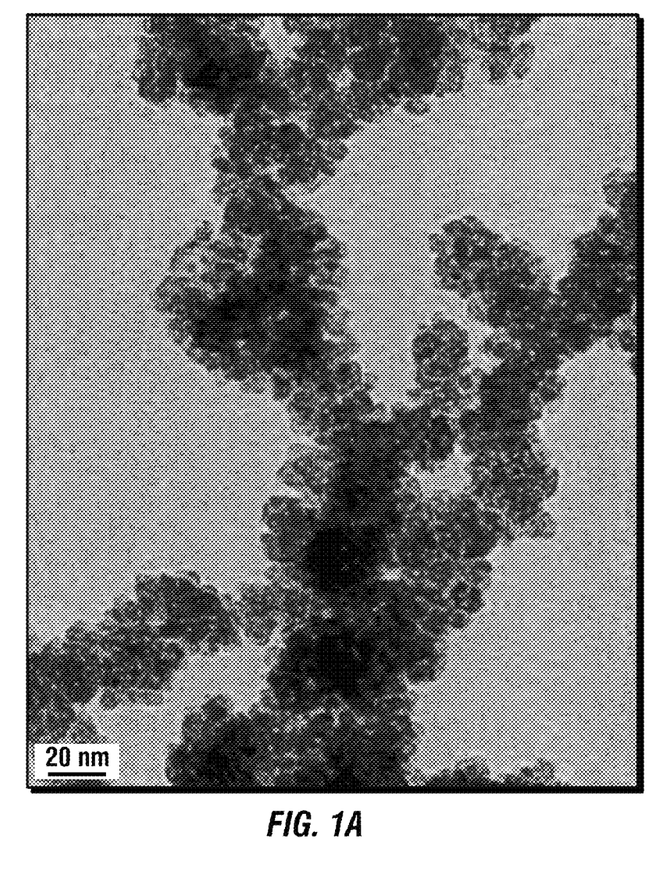
FIGS. 1A-1C show characterization of crystalline cobalt (II) oxide nanoparticles with transmission electron microscopy (FIG. 1A), selective area electron diffraction (SAED) (FIG. 1B) and X-ray photoemission spectra (XPS) (FIG. 1C). Also shown in FIG. 1C is XPS of $Co_3O_4$ micropowders.
Figure 1B:
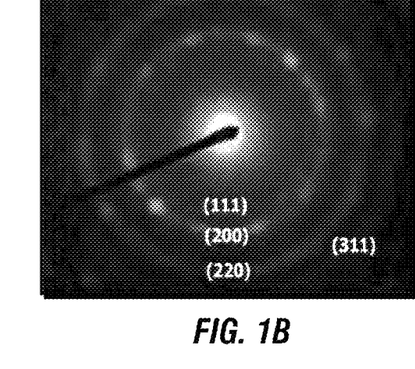
Figure 1C:
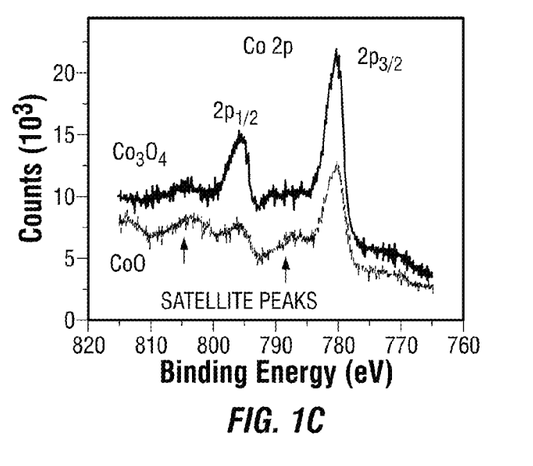

Nanoparticles of cobalt (II) oxide were characterized with transmission electron microscopy (TEM), selective area electron diffraction (SAED) and X-ray photoemission spectra (XPS). The TEM image in FIG. 1A indicates that the average particle size is less than 10 nm. The SAED pattern in FIG. 1B reveals the cubic lattice structure of cobalt (II) oxide nanoparticles. FIG. 1C shows Co2p XPS of the cobalt (II) oxide nanoparticles and $Co_3O_4$ micropowders: two relatively stronger satellite features with respect to $2p_{3/2}$ and $2p_{1/2}$ in nanoparticles further confirm their CoO chemical nature.

Example 2

Water-splitting experiments were performed in air-tight flasks with cobalt (II) oxide nanoparticles suspended in neutral water. The nanoparticle suspension was illuminated through the bottom of the flask using either a 532-nm solid-state laser or an AM 1.5 G solar simulator (Newport 91160). The generated hydrogen and oxygen were sampled by a syringe (Gastight, Hamilton) and measured by a gas chromatograph (GC) equipped with a thermal conduction detector (Gow-Mac). A mass spectrometer (SRS residue gas analyzer, RGA200) was also used to identify isotope gas species from water-splitting.

Example 3

Figure 2A:
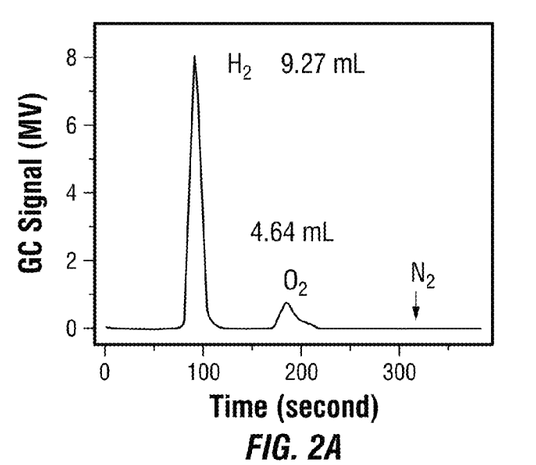
Figure 2B:
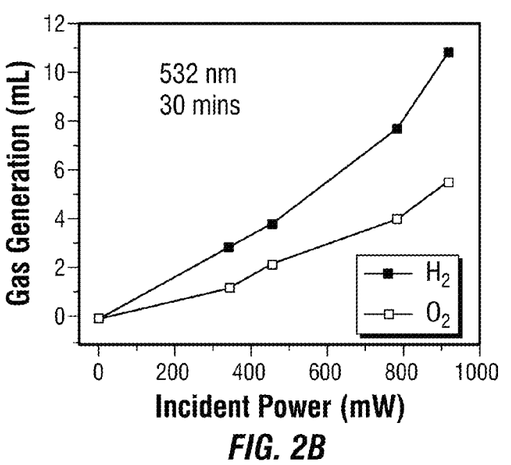

The first sign of OWS is revealed by a typical GC trace shown in FIG. 2A. Not only were both $H_2$ and $O_2$ simultaneously generated, but also the $H_2$ to $O_2$ ratio was very close to the expected 2:1 stoichiometry. The very weak $N_2$ GC signal indicates that the reaction flask was air tight, and $O_2$ from air background was negligible. An essential qualification for photocatalytic reaction is that the reaction rate must depend on the light intensity. This indeed was the case as no $H_2$ and $O_2$ was observed when the system was kept in the dark (FIG. 2B). The production of $H_2$ and $O_2$ increases as the intensity of incident light increases. Again a nearly 2:1 ratio of $H_2$ to $O_2$ was observed.

Example 4

Figure 2C:
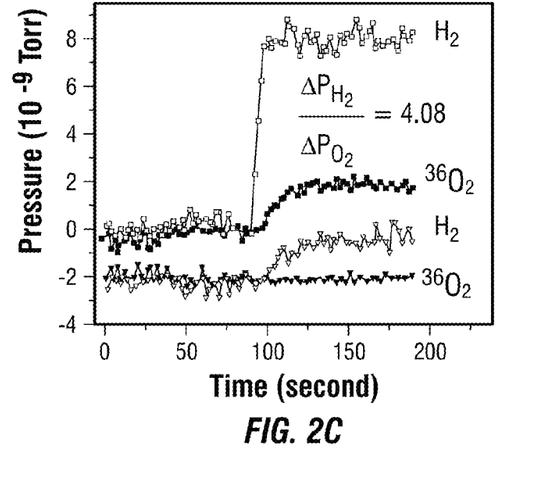
FIG. 2C shows pressure evolutions of $H_2$ and $^{36}O_2$ after 1 mL of gas sample was injected into the mass spectrometer. Top two curves depict: gas from photocatalytic reaction. Bottom two curves are representative of: air.
Figure 2D:
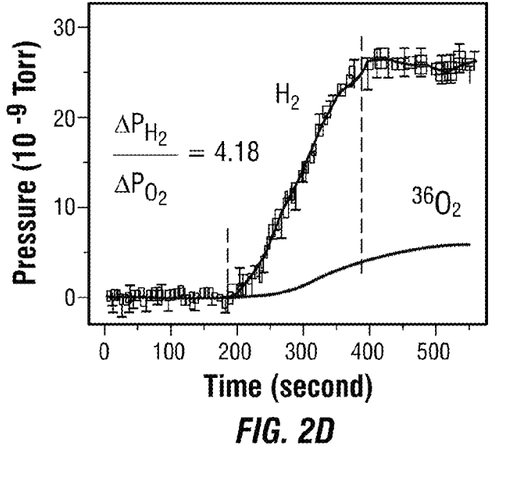
FIG. 2D shows pressure evolutions of $H_2$ and $^{36}O_2$ when $^{18}O$-labeled water was electrolyzed. Two dashed vertical lines mark the beginning and end of water electrolysis.

A photocatalytic water-splitting requires that the oxygen come from the water instead of cobalt (II) oxide photocatalyst. In order to identify the origin of oxygen, Applicants employed $^{18}O$ isotope labeled water (Cambridge Isotope, 97%) in the experiment. Applicants also developed a system based on a mass spectrometer to identify and quantify isotope gas species. FIG. 2C shows partial pressure evolutions of $H_2$ and $^{36}O_2$. When 1 mL gas sample from the reaction flask was injected into a small vacuum chamber connected to the mass spectrometer, a fast increases in gas partial pressure was observed for both $H_2$ and $^{36}O_2$. In contrast, no detectable change for $^{36}O_2$ was observed when 1 mL of air was injected (bottom curves in FIG. 2C). This observation is strong evidence that the generated oxygen comes from the isotope labeled water. The $H_2$ RGA response from the injection of air is not due to a high concentration of $H_2$ in the injected air. To quantitatively determine the $H_2$ to $^{36}O_2$ ratio from the RGA traces, Applicants calibrated the response of system with a fixed 2:1 $H_2$ to $^{36}O_2$ ratio. Basically, Applicants used electrolysis to split the same $H_2$ $^{18}O$, and monitored the gas production in-situ with the mass spectrometer. FIG. 2D shows RGA pressure traces for both $H_2$ and $^{36}O_2$ with ~4.18 as the ratio of $H_2$ to $^{36}O_2$ in pressure change. This value is very close to the observed ratio of 4.08 in FIG. 2C, implying a similar $H_2$ to $^{36}O_2$ ratio in photocatalytic water splitting as in water electrolysis. A nearly 2:1 $H_2$ to $^{36}O_2$ ratio was also obtained by GC analysis, further confirming a stoichiometric splitting of water.

Example 5

The conclusion of cobalt (II) oxide nanoparticle photocatalytic water-splitting is also supported by following observations. There was no apparent change to the pH (6.7-6.9) of water before and after the reaction, which is another indication of stoichiometric decomposition of pure water, because a non-stoichiometric generation of $H_2$ and $O_2$ will change the balance between $OH^-$ and $H^+$ concentrations in water. The same experiment was repeated with 2-3 g of cobalt oxide micropowders, and no water splitting was observed. This observation agrees with theoretical predictions and confirms that bulk cobalt oxide is not a suitable photocatalyst because its conduction band edge is located more than 600 mV below the hydrogen evolution potential. This observation also implies that the generation of hydrogen and oxygen cannot be explained by simple enhancement of the surface area of the nanocrystals relative to bulk cobalt oxide micropowders.

Example 6

Figure 3A:
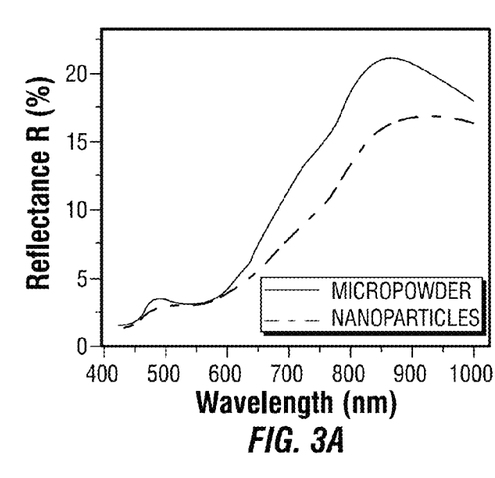
Figure 3B:
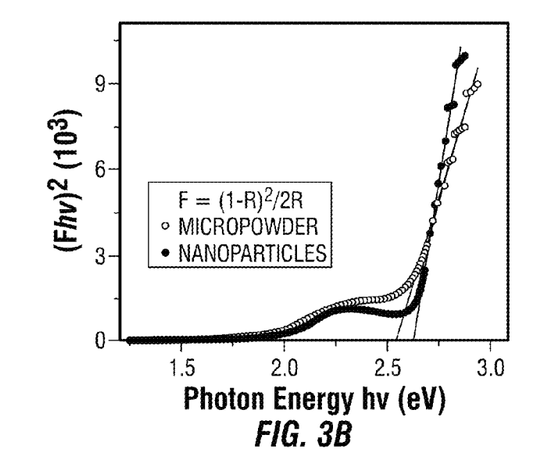
FIG. 3B shows plots of $(Fh\nu)^2$ as a function of photon energy, where F is the Kubelka-Munk function of the diffuse reflectance R from (FIG. 3A). The intercepts of extrapolated straight lines give the corresponding direct band gaps of cobalt (II) oxide nanocrystals and cobalt oxide powders. Mott-Schottky plots for cobalt (II) oxide nanocrystals (FIG. 3C) and cobalt oxide micropowders according to impedance measurement. The flat-band potentials are obtained from the intercepts of the extrapolated lines.

Nanotechnology has been regarded as an important means to modify a material's optical and electrochemical properties. Due to quantum confinement, nanostructures typically have larger band gaps than the corresponding bulk materials. As a result, the absolute potentials of conduction and valence band edges have to be adjusted. An up-shift of conduction band-edge positions is observed in nanostructures such as α-$Fe_2O_3$ and CdSe quantum dots. To understand the difference in catalytic activity between cobalt (II) oxide nanocrystals and micropowders and to investigate the quantum size effect on the reactivity of cobalt (II) oxide nanocrystals, Applicants measured their band gaps using diffuse reflectance spectroscopy. FIG. 3A shows the reflectivity spectra of both samples. The corresponding band gaps were obtained from the corresponding modified Kubelka-Munk function as shown in FIG. 3B. It can be seen that cobalt (II) oxide nanocrystals have a slightly lower band gap than bulk cobalt oxide powders, which is in agreement with their lower reflectance in FIG. 3A. However, the two band gaps are very close to 2.6 eV, a value similar to what has been reported in the literature. This lack of a quantum-confinement effect is probably due to the relatively large size (5-8 nm) of cobalt (II) oxide nanoparticles.

Example 7

Figure 3C:
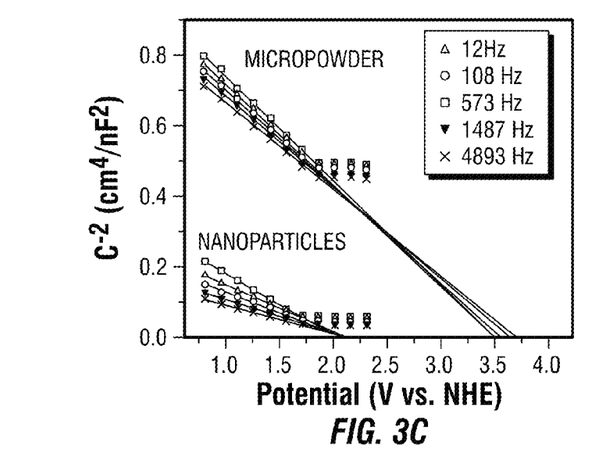

Surface state or morphology of nanostructures can also effect the band edge positions of a material. To obtain absolute band-edge positions with respect to water redox potentials, Applicants fabricated cobalt (II) oxide thin-film electrodes on fluorinated tin oxide (FTO) glass using cobalt (II) oxide nanocrystals and micropowders and measured their flat-band potentials. FIG. 3C shows the Mott-Schottky (M-S) plots of both films, i.e., $1/C^2$ as function of electrochemical potentials, where capacitance C was obtained from the impedance measurement. Unlike band gap a significant difference in the flat-band potentials between nanocrystals and micropowders was observed, with the flat-band potential of cobalt (II) oxide nanocrystals less than of micropowders by more than 1 V. Negative slopes of M-S plots indicate that CoO is p-type, which is believed to be due to oxygen excess.

Figure 3D:
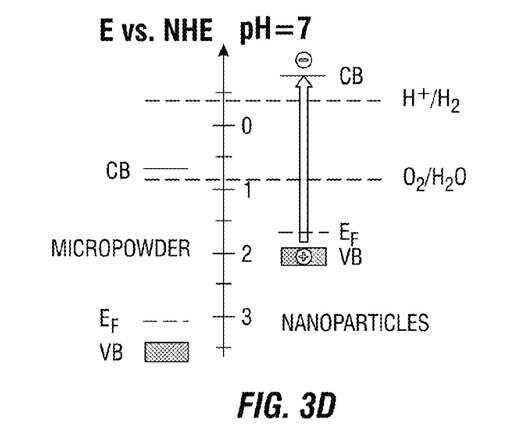
FIG. 3D show band positions of cobalt (II) oxide nanocrystals and cobalt monoxide micropowders according to the band gaps and flat-band potentials obtained from (FIG. 3C).

FIG. 3D shows the approximate band-edge positions of both nanocrystals and micropowders based on the above-measured flat-band potentials, which are the differences between Fermi levels and water-reduction potential. Here Applicants assumed that Fermi levels are about 0.3 eV above the valence bands for lightly doped p-type CoO. Despite a lack of the precise value of the position of Fermi level in the band gap, important conclusions can be drawn from the energy diagram in FIG. 3D. As can be seen, a qualitative difference exists between cobalt (II) oxide nanocrystals and micropowders in their band-edge positions with regard to water redox potentials. In agreement with previous theoretical calculations, the conduction band-edge position of cobalt oxide micropowders is located below the hydrogen evolution potential, indicating why the powders are not photocatalytically active for water splitting. In contrast, the conduction band edge of cobalt (II) oxide nanocrystals rises above the hydrogen evolution potential, while the band edge of the valence band lies below the oxygen evolution potential. This band alignment of cobalt (II) oxide nanocrystals with water redox potentials explains why nanocrystals have significantly different photocatalytic activity from micropowders because it satisfies the necessary requirement for overall water splitting.

Example 8

One of most important factors limiting the solar-to-fuel application is its low conversion efficiency. Because most photocatalysts can only respond to UV light, their solar-to-hydrogen efficiency is not frequently reported. The recently reported efficiency of white-light water splitting devices is about 0.1%, which is far less than the efficiency of commercial photovoltaic cells. In order to obtain solar-to-hydrogen efficiency, Applicants loaded ~25 mg of crystalline cobalt (II) oxide nanoparticles in the flask, and illuminated the particles with the AM1.5 G simulated sunlight (100 $mW/cm^2$). After 30 minutes of illumination, an average of 20 mL $H_2$ was obtained, corresponding to 210 J of free energy. The total incident power over 19 $cm^2$ bottom of the flask is 1.9 W so the total input energy over 30 minutes is 3420 J. A solar-to-hydrogen efficiency of ~5% is obtained assuming all incident light was absorbed by optically thick nanoparticle suspension. This efficiency is 50 times larger than before, and is comparable with the efficiency achieved with artificial leaf based on the integration of three junction solar cells and optimized hydrogen and oxygen evolution catalysts.

Like many single-component photocatalysts, crystalline cobalt (II) oxide nanoparticles also suffer from short lifetime: they become deactivated after about one hour of reaction. X-ray diffraction (XRD) analysis shows that deactivated nanoparticles maintain as cobalt (II) oxide single crystals, but the XRD line width increases slightly. TEM images reveals that the deactivated nanoparticles do not exhibit sharp facets as shown in FIG. 1A. XPS shows a slight deviation of spectrum from that of the fresh crystalline cobalt (II) oxide nanoparticles shown in FIG. 1C. These preliminary studies indicate that the surfaces of crystalline cobalt (II) oxide nanoparticles have been corroded or oxidized. In an embodiment of the present disclosure, it is contemplated that the deactivation may be reduced or eliminated by integrating crystalline cobalt (II) oxide nanoparticles with suitable co-catalysts or nanostructures.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

REFERENCES

1. Chen, X. B., Shen, S. H., Guo, L. J. & Mao, S. S. Semiconductor-based Photocatalytic Hydrogen Generation. *Chem. Rev.* 110, 6503-6570 (2010).
2. Kudo. A. Y. Heterogeneous photocatalyst materials for water splitting. *Chem. Soc. Rev.* 38, 253-278 (2009).
3. Osterloh, F. E. & Parkinson, B. A. Recent developments in solar water-splitting photocatalysis. *MRS Bull.* 36, 17-22 (2011).
4. Mallouk, T. E. The Emerging Technology of Solar Fuels, *J Ph s. Chem. Lett.* 1, 2738-2739 (2010),
5. Fujishima, A. & Honda, K. Electrochemical photolysis of water at a semiconductor electrode. *Nature* 238, 37(1972).
6. Walter, M. G. et al. Solar Water Splitting Cells, *Chem. Rev.* 110, 6446-6473 (2010).

7. Zhao, Z. W., Konstantinov, K., Yuan. L., Liu, H. K. & Dou, S. X. In-situ fabrication of nanostructured cobalt oxide powders by spray pyrolysis technique, *J Nanosci. Nanotechnol.* 4, 861-866 (2004).
8. Zou, Z. G., Ye, J. H., Sayama, K. & Arakawa, H. Direct splitting of water under visible light irradiation with an oxide semiconductor photocatalyst, *Nature* 414, 625-627 (2001).
9. Maeda, K., Teramura, K. & Domen, K. Effect of post-calcination on photocatalytic activity of (Ga1-xZnx)(N1-xOx) solid solution for overall water splitting under visible light. *J Catal.* 254, 198-204 (2008).
10. Mubeen, S. et al. An autonomous photosynthetic device in which all charge carriers derive from surface plasmons, *Nat. Nanotechnol.* 8, 247-251 (2013).
11. Liu, C., Tang, J., Chen, H. M., Liu, B. & Yang, P. A Fully Intewated Nanosystem of Semiconductor Nanowires for Direct Solar Water Splitting. *Nano Lett.* 13, 2989-92 (2013).
12. Yang, J., Liu, H. W., Martens, W. N. & Frost, R. L. Synthesis and Characterization of Cobalt Hydroxide, Cobalt Oxyhydroxide and Cobalt Oxide anodises. *J. Phys. Chem. C* 114, 111-119 (2010).
13. Yang, G. W. Laser ablation in liquids: Applications in the synthesis of nanocrystals. *Prag. Mater. Sci.* 52, 648-698 (2007).
14. Xu, Y. & Schoonen, M. A. A. The absolute energy positions of conduction and valence bands of selected semiconducting minerals. *Am. Miner.* 85, 543-556 (2000).
15. Vayssieres, L. et al. One-dimensional quantum-confinement effect in alpha-Fe2O3 ultrafine nanorod arrays. *Adv. Mater.* 17, 2320-2323 (2005).
16. Shi, H. G. & He, X. M. Large-scale synthesis and magnetic properties of cubic CoO nanoparticles. *J. Phys. Chem. Solids* 73, 646-650 (201.2).
17. Yin, J. S. Wang, Z. L. Ordered self-assembling of tetrahedral oxide nanocrystals. *Phys. Rev. Lett.* 79, 2570-2573 (1997).
18. Barreca, D. et al. Controlled vapor-phase synthesis of cobalt oxide nanomaterials with tuned composition and spatial organization, *Crystengcomm* 12, 2185-12197 (2010).
19. Gallant, D., Pezolet, M. & Simard, S. Optical and physical properties of cobalt oxide films electrogenerated in bicarbonate aqueous media. *J. Phys. Chem. B* 110, 6871-6880 (2006).
20. Amirav, L. & Alivisatos, A. P. Photocatalytic Hydrogen Production with Tunable Nanorod Heterostructures. *J. Phys. Chem. Lett.* 1, 1051-1054 (2010).
21. Wang, K. L. & Turner, J. A. Characterization of Hematite Thin Films for Photoelectrochemical Water Splitting in a Dual Photoelectrode Device. *J. Electrochem. Soc.* 157, F173-F1 78 (2010).
22. Markus, T. Z. et al. Electronic Structure of CdSe Nanoparticles Adsorbed on Au Electrodes by an Organic Linker: Fermi Level Pinning of the HOMO. *J. Phys. Chem.* C113, 14200-14206 (2009).
23. Frame, F. A. et al. First demonstration of CdSe as a photocatalyst for hydrogen evolution from water under UV and visible light. *Chem. Commun.*, 19, 2206-2208 (2008).
24. McCarthy, T. J., Tanzer, T. A. & Kanatzidis, M. G. A new metastable, 3-dimensional bismuth sulfide with large tunnels—synthesis, structural characterization, ion-exchange properties, and reactivity of $KBi_3S_5$. *J. Am. Chem. Soc.* 117, 1294-1301 (1995).
25. Holmes, M. A., Townsend, T. K. & Osterloh, F. E. Quantum confinement controlled photocatalytic water splitting by suspended CdSe nanocrystals. *Chem. Commun.* 48, 371-373 (2012).
26. Jasieniak, J., Califano, M. & Watkins, S. E. Size-Dependent Valence and Conduction Band-Edge Energies of Semiconductor Nanocrystals, *ACS Nano* 5, 5888-5902 (2011).
27. Ishikawa, A. et al. Oxysulfide $Sm_2Ti_2S_2O_5$ as a stable photocatalyst for water oxidation and reduction under visible light irradiation (lambda<=650 nm). *J. Am. Chem. Soc.* 124, 13547 13553 (2002).
28. Pinaud, B. A., Chen, Z. B., Abram, D. N. & Jaramillo, T. F. Thin Films of Sodium Birnessite-Type MnO(2): Optical Properties, Electronic Band Structure, and Solar Photoelectrochemistry. *J. Phys. Chem. C* 115, 11830-11838 (2011).
29. Nocera, D. G. The Artificial Leaf, *Accounts Chem. Res.* 45, 767-776 (2012).
30. Riha, S. C. et al. Atomic Layer Deposition of a Submonolayer Catalyst for the Enhanced Photoelectrochemical Performance of Water Oxidation with Hematite. *ACS Nano* 7, 2396-2405 (2013).
31. Marinescu, S. C., Winkler, J. R. & Gray, H. B. Molecular mechanisms of cobalt-catalyzed hydrogen evolution. *Proc. Natl. Acad. Sci. U.S.A.* 109, 15127-15131 (2012).
32. Jiao, F. & Frei, H. Nanostructured Cobalt Oxide Clusters in Mesoporous Silica as Efficient Oxygen-Evolving Catalysts. *Angew. Chem.-Int. Edit.* 48, 1841-1844 (2009).

What is claimed is:

1. A photocatalyst for generating hydrogen from water comprising:
nanocrystalline cobalt (II) oxide nanoparticles, wherein the flat-band potential of the photocatalyst is less than that of bulk cobalt oxide micropowders by more than 1 eV, wherein the photocatalyst is activated using visible light irradiation, and wherein the photocatalyst has a solar-to-hydrogen energy conversion efficiency of about 5%, without co-catalysts or sacrificial chemicals.

2. The photocatalyst of claim 1, wherein the visible light irradiation used to activate the photocatalyst ranges from about 400 nm to about 700 nm.

3. The photocatalyst of claim 1, wherein the visible light irradiation used to activate the photocatalyst is 650 nm.

4. The photocatalyst of claim 1, wherein the average size of the nanoparticles is less than 10 nm.

5. The photocatalyst of claim 1, wherein the cobalt (II) oxide nanoparticles form a cubic lattice structure.

6. The photocatalyst of claim 1, wherein the photocatalyst has a conduction-band edge potential above the hydrogen-evolution potential.

7. The photocatalyst of claim 1, wherein the photocatalyst has a valence-band edge potential below the oxygen-evolution potential.

8. The photocatalyst of claim 1, wherein upon activation the photocatalyst splits water to generate $H_2$ and $O_2$ in a stoichiometric 2:1 ratio.

9. The photocatalyst of claim 1, wherein the photocatalyst is fabricated by femtosecond laser ablation of bulk cobalt oxide micropowders.

10. The photocatalyst of claim 1, wherein the photocatalyst is fabricated by ball milling of bulk cobalt oxide micropowders.

11. The photocatalyst of claim 1, wherein the photocatalyst is further configured to receive a co-catalyst for enhancement of the photocatalytic reaction.

12. A method of generating hydrogen from water comprising:
- suspending a nanocrystalline photocatalyst in water;
- heating the formed suspension;
- activating the nanocrystalline photocatalyst by exposing the water to light irradiation; and
- separating the hydrogen gas generated,
- wherein the nanocrystalline photocatalyst comprises cobalt (II) oxide nanoparticles; and wherein the nanocrystalline photocatalyst decomposes the water to generate $H_2$ and $O_2$ in a stoichiometric 2:1 ratio.

13. The method of claim 12, wherein the flat-band potential of the photocatalyst is less than that of bulk cobalt oxide micropowders by more than 1 eV.

14. The method of claim 12, wherein the average size of the nanoparticles is less than 10 nm.

15. The method of claim 12, wherein the cobalt (II) oxide nanoparticles form a cubic lattice structure.

16. The method of claim 12, wherein the photocatalyst has a conduction-band edge potential above the hydrogen-evolution potential.

17. The method of claim 12, wherein the photocatalyst has a valence-band edge potential below the oxygen-evolution potential.

18. The method of claim 12, wherein the photocatalyst has a solar-to-hydrogen energy conversion efficiency of about cobalt (II) oxide.

19. The method of claim 12, wherein the photocatalyst is fabricated by femtosecond laser ablation of bulk cobalt oxide micropowders.

20. The method of claim 12, wherein the photocatalyst is fabricated by ball milling of bulk cobalt oxide micropowders.

21. The method of claim 12, wherein the photocatalyst is further configured to receive a co-catalyst for enhancement of the photocatalytic reaction.

22. The method of claim 12, wherein the suspension is heated to 60° C.

23. The method of claim 12, wherein the photocatalyst is activated by exposing to a wavelength of light ranging from about 400 nm to about 700 nm.

* * * * *